Patented Nov. 5, 1940

UNITED STATES PATENT OFFICE 2,220,623

CYCLOPENTANO - PHENANTHRENE COMPOUNDS AND METHOD OF PRODUCING SAME

Erwin Schwenk, Montclair, N. J., and Bradley Whitman, New York, N. Y., assignors to Schering Corporation, Bloomfield, N. J., a corporation of New Jersey No Drawing. Application May 6, 1936, Serial No. 78,222

27 Claims. (Cl. 260—397)

The present invention relates to the production of compounds having the cyclopentano-polyhydro-phenanthrene structure in their molecules by the decomposition, or more specifically the "cracking," of compounds of similar molecular structure, but having a substituting alkyl or aralkyl group containing a methylene group, whereby such substituting group is split off in whole or in part.

This application is a continuation-in-part of our copending application Serial No. 751,578, filed November 5, 1934, which issued on May 4, 1937, as Patent No. 2,078,978.

According to the present invention, cyclopentano polyhydro phenanthrene compounds, such as sterolic compounds, of the general formula

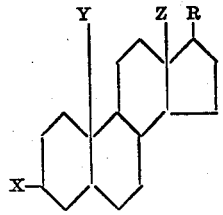

wherein X is H, HH, O, OH, or a group which on hydrolysis is converted into a hydroxyl group, Y and Z are hydrogen or a methyl group, and R is a substituting group which includes an aliphatic chain of a plurality of carbon atoms and containing a methylene group, and also the compounds which are derivable from the hydroxy compounds by splitting off water formed by the OH group and the neighboring hydrogen, that is, the anhydro compounds, and wherein the cyclopentano polyhydro phenanthrene nucleus and the group R are saturated or unsaturated, are subjected to a partial cracking to remove all or part of the R group while the nucleus itself remains unbroken. The invention thus contemplates the cracking also of compounds containing the cyclopentano-polyhydro-phenanthrene nucleus and having the formula

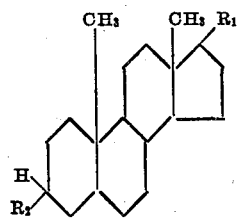

wherein $R_1$ is an aliphatic side chain, and $R_2$ is an OH group or a group which on hydrolysis is converted into a hydroxyl group.

We have found that it is possible to split off the side chain of cyclopentano-phenanthrene compounds, particularly sterolic compounds, including cholestene, cholestane, dihydrocholesterol, tetrahydrostigmasterol, dihydrositosterol, tetrahydroergosterol, coprosterol, epi-dihydrocholesterol and their derivatives, like cholestanone, cholestenone, the organic and inorganic esters and ethers of these compounds, like dihydrocholesterol-methylether, bis-dihydrocholesterylether, their acetals and the like, by a process of overheating or superheating these compounds alone or in the presence of diluents or catalysts to a cracking temperature. As diluents, substances of an inert character like hydrocarbons may be used, provided that the boiling point is not substantially lower than the decomposition temperature of the sterol compound or its derivative. As catalysts, finely divided metals or salts may be used, such as finely divided nickel, palladium, platinum and other metals or mixtures thereof, cuprous chloride, aluminum chloride and other known catalysts employed in cracking operations. The reaction is carried out under such conditions that the side chain is split off in the form of a hydrocarbon, such as iso-octane or iso-octene, the following equations showing the probable course of the reaction in the case of, for example, cholestanone, the symbol R representing the substituted and at least partially hydrogenated phenanthrene group

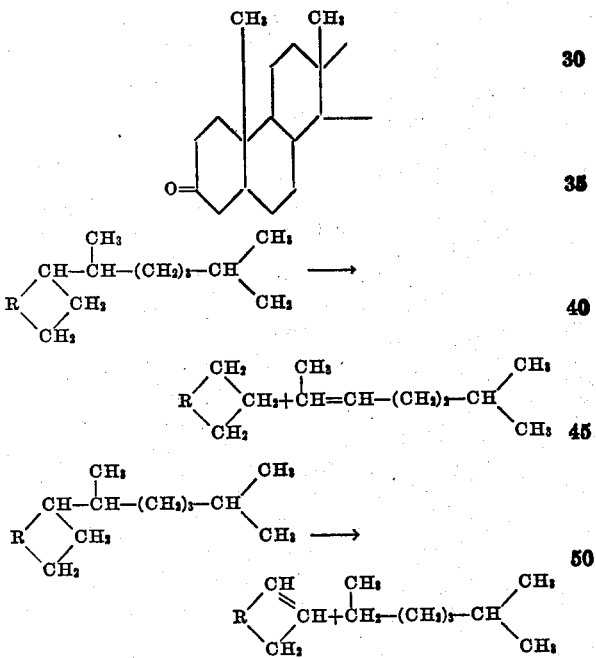

The yields of the cracking reaction are remarkably high, sometimes being quantitative.

We have found that the compounds which remain after the splitting reaction is performed are oily or crystalline substances and are suitable for the preparation of pharmaceutical substances of the cyclopentano-phenanthrene type, and particularly of hormones and substances having a physiological activity similar to that of hormones; and in a further development of the invention these compounds are treated to introduce desirable substituting groups into the molecule.

The cracking is accomplished by heating the sterol compound at a temperature considerably above its melting point and even at or near its boiling point. The temperature range of 280°–400° C. will be found to be suitable for most compounds. The time of reaction will depend on the temperature and on the nature of the compound being heated, but the end point of the reaction can generally be determined by weighing the distilled by-product or by-products. The reaction is preferably carried on under such conditions that the split-off side chain is distilled off, so that the equilibrium is disturbed and the reaction proceeds in the desired direction. Sometimes it is good to use a low vacuum for carrying off the split products, or a stream of inert gas may be used for the same purpose.

By superheating or partial cracking is to be understood heating to a temperature at which the aliphatic side chain is split off, the temperature being maintained within a relatively narrow range above this minimum temperature, and in no event is the temperature to be raised to such a point that cracking of the nucleus occurs to any considerable extent.

The invention will be described in greater detail with the aid of the following examples which are presented by way of illustration only and not as indicating the limits of the invention:

*Example 1*

20 g. of cholestene (obtained from dihydrocholesterol by splitting off water with 80% sulfuric acid and recrystallized, and having a M. P. of 72–74° C.) are superheated so that a mixture of iso-octane and iso-octene is slowly distilled off. The residue is dissolved in acetic acid and 1% of silver sulfate (based on the weight of the residue) is added. To this mixture 10 g. of hydrogenperoxide containing 30 vol. per cent. of hydrogenperoxide are added drop by drop under cooling from the outside. The reaction mixture is stirred vigorously and then left standing for 15 hours at room temperature. A mixture of oxidation products is obtained, which is taken up with ether, the ether solution washed with water and soda solution to remove acetic acid, again with water and then the ether is removed by distillation. The residue is heated gently with a solution of a mineral acid, as for instance, 5% alcoholic sulfuric acid to rearrange the oxides that are obtained to the keto form. The reaction mixture is taken up with ether, this solution washed with water, soda solution and water again and dried. The residue after evaporation is dissolved in 10 times its weight of alcohol and precipitated with semicarbazide solution, which gives the disemicarbazide of androstanedione. By splitting this semicarbazide in known manner androstanedione (M. P. 129° C.) is obtained.

*Example 2*

10 g. dihydrocholesterol-methyl-ether are heated to a cracking temperature as described in Example 1. A similar mixture of iso-octane and iso-ocetene is obtained. The residue, after standing for several days, solidifies in white crystals. Analysis reveals them to be a mixture of 3-methoxy-androstane and 3-methoxy-androstene, which is confirmed by titration with perbenzoic acid or bromine solution. The yield is more than 90% of the theoretical. By oxidizing this mixture with perbenzoic acid and treating this reaction product, which contains an oxide, with dilute aqueous or alcoholic acids or alkali or other compounds, rearranging oxides like zinc chloride or concentrated acids, for instance, 80% phosphoric acid, a mixture of substances is obtained from which ketonic reagents, like semicarbazide salts, precipitate the 3-methoxy-trans- androsterone (17) in the form of a condensate from which the free 3-methoxy-trans-androsterone (17) is obtained by known methods. The crystals have a double melting point: 42° and 73° C. This product is identical with the substance obtained from the methyl ether or dihydrocholesterol with chromic acid according to Ruzicka's known method. From it by hydrolysis of the methoxy group the trans-androsterone can be obtained. In place of the ether, employed above, other ethers may be used, such as methoxymethyl ether, dinitrophenyl ether and others.

*Example 3*

20 g. of bis-cholesteryl ether (M. P. 190° C.) are heated to gentle boiling, the temperature not exceeding 400°. A volatile substance is distilled off which, on cooling, condenses to a light fluid. By re-distilling, this fluid is found to consist of a mixture of iso-octane and iso-octene. The residue, which is obtained in about theoretical yield, crystallizes from alcohol or other solvents, the crystals melting non-sharply at 160–170° C. This substance is dissolved in acetic acid and a soluaion of peractive acid is added which is prepared in the usual way and contains the equivalent of 110% of the theory for the addition of one oxygen atom to one double bond. The reaction mixture is kept at 0° for 24 hours, only the theoretical amount for one double bond being absorbed. The reaction mixture is poured into water, shaken out with ether and washed thoroughly to remove the surplus of reagent. The ether is dried and evaporated, the residue taken up with 10 times its amount of an alcoholic solution of hydrochloric acid containing 5% HCl. This mixture is boiled for five hours, then diluted with water and extracted with ether, the ether washed with water to remove the alcohol and with soda to remove the acid. The ether solution is evaporated and dried. The residue is now taken up with 10 times its amount of alcohol, a solution of semicarbazide acetate in alcohol added and the mixture boiled for 2 hours. The solid substance which is precipitated consists of the semi-carbazide of the bis-dehydroandrosterone ether. It is split with an alcoholic solution of oxalic acid, whereby the bis-dehydroandrosterone ether is obtained as a solid which after recrystallization melts at about 225°. By boiling with hydrochloric acid this ether is easily split and yields dehydroandrosterone.

*Example 4*

10 g. of epi-dihydrocholesterol are mixed with 1 g. of cuprous chloride in finely powdered state and then cautiously heated to cracking temperature (about 360° C.). The residue, after the octane-octene mixture is driven off, contains among other compounds 3-hydroxy-androstane and the corresponding androstene, which are isolated from the mixture by crystallization from acetone, whereby the more soluble cracked compounds remain in solution, while the unchanged starting material crystallizes out.

*Example 5*

10 g. of cholestanone are heated with an equal amount of a high boiling hydrocarbon like phenanthrene for 15 hours at approximately the boiling point of the mixture. With the phenanthrene, the iso-octane mixture distills off. By crystallization from methyl alcohol, the phenanthrene and 3-keto androstene are separated from the residue. In place of cholestanone, cholestanone dichloride and other substitution products can be used.

From the above it will be seen that we have provided a process whereby cyclopentano-phenanthrene compounds, of saturated or unsaturated nature, having an aliphatic side chain in the molecule are cracked at such side chain, yielding compounds which may be treated to yield therapeutically valuable substances, as by being oxidized to compounds of the androsterone group.

It will be understood that variations in the specific procedures disclosed may be resorted to within the scope of the appended claims without departing from the spirit of the invention. Thus, other known methods of oxidation and other known ketone reagents for effecting separation of ketonic substances than those disclosed may be employed, or the reaction product may be isolated in any other known manner.

We claim:

1. The method of producing therapeutically valuable substances, which comprises heating a cyclopentano-polyhydro-phenanthrene compound having a hydrocarbon side chain of a plurality of carbon atoms in the 17-position, at temperatures at which one or more carbon compounds whose carbon atoms originate in such side chain are split off but at which the cyclopentano-polyhydro-phenanthrene nucleus remains intact, and then oxidizing the residual compound to join one or more oxygen atoms to the cyclopentano-polyhydro-phenanthrene nucleus.

2. The method of producing therapeutically valuable substances, which comprises heating a cyclopentano-phenanthrene compound having a hydrocarbon side chain of a plurality of carbon atoms in the 17-position, at temperatures at which the side chain is split off, but at which the cyclopentano-phenanthrene nucleus remains intact, subjecting the residue to the action of an oxidizing agent which joins one or more oxygen atoms to the nucleus, treating the reaction product with an agent capable of effecting molecular rearrangement of the oxide so produced to the ketonic form, reacting the ketone-containing mixture with a ketone reagent, separating the ketonic reaction product, and hydrolyzing the latter to liberate the ketone.

3. The method of producing degradation products having the cyclopentano polyhydro phenanthrene structure, which comprises heating a cyclopentano polyhydro phenanthrene compound having a hydrocarbon side chain of a plurality of carbon atoms joined to the nucleus in the 17-position, to a cracking temperature at which a compound of a plurality of carbon atoms originating in such side chain is split off but at which the cyclopentano phenanthrene nucleus remains intact.

4. The method of producing degradation products having the cyclopentano polyhydro phenanthrene structure, which comprises heating a sterolic compound to a cracking temperature at which a compound of a plurality of carbon atoms originating in such side chain is split off but at which the cyclopentano phenanthrene nucleus remains intact.

5. The method of producing degradation products having the cyclopentano-polyhydro-phenanthrene structure, which comprises heating a compound of the general formula $$R_1[R]R_2$$

wherein R is a group containing the cyclopentano-polyhydro-phenanthrene structure, $R_1$ is in the 3-position and is a member of the group consisting of H, HH, O, OH,

and a group which on hydrolysis is converted into a hydroxyl group, the compound being unsaturated in the first ring when R is H or OH, and $R_2$ is in the 17-position and includes an aliphatic hydrocarbon side chain of a plurality of carbon atoms to a cracking temperature at which a compound of a plurality of carbon atoms originating in such side chain is split off but at which the cyclopentano phenanthrene structure remains intact.

6. The method of producing degradation products having the cyclopentano polyhydro phenanthrene structure, which comprises heating a compound of the general formula $$R_1[R]R_2$$

wherein R is a group containing the cyclopentano polyhydro phenanthrene structure, $R_1$ is in the 3-position and is a member of the group consisting of H, HH, O, OH,

and a group which on hydrolysis is converted into a hydroxyl group, the compound being unsaturated in the first ring when R is H or OH, and $R_2$ is in the 17-position and is an aliphatic group containing eight carbon atoms, at temperatures at which the $R_2$ group is split off but at which the cyclopentano polyhydro phenanthrene structure structure remains intact.

7. The method of producing degradation products having the cyclopentano-polyhydro-phenanthrene structure, which comprises heating a compound of the general formula $$R_1[R]R_2$$

wherein R is a group containing the cyclopentano-polyhydro-phenanthrene structure, $R_1$ is in the 3-position and is a member of the group consisting of H, HH, O, OH,

and a group which on hydrolysis is converted into a hydroxyl group, the compound being unsaturated in the first ring when R is H or OH, and $R_2$ is in the 17-position and is the group —CH(CH$_3$)(CH$_2$)$_3$ CH (CH$_3$)$_2$, at temperatures at which the $R_2$ group is split off but at which the cyclopentano-polyhydro-phenanthrene structure remains intact, and then oxidizing the product to introduce an oxygen atom into the cyclopentano group.

8. The method of producing cyclopentanophenanthrene compounds of reduced molecular weight which comprises subjecting a member of the group consisting of cholestene, cholestane, dihydrocholesterol, tetrahydrostigmasterol, dihydrositosterol, tetrahydroergosterol, coprosterol, epidihydrocholesterol, and their derivatives of the class consisting of their hydrogenation products and 3-ketones, organic and inorganic esters, ethers, and acetals, to a temperature at which the aliphatic side chain is split off but at which the cyclopentano-phenanthrene structure remains intact.

9. The method of producing cyclopentano polyhydro phenanthrene compounds which comprises subjecting a compound of the group consisting of cholestene and cholestane and derivatives thereof having in the 3-position a substituent of the class consisting of hydroxyl and groups which on hydrolysis are replaced by hydroxyl, to a cracking temperature at which the aliphatic side chain is split off, while the cyclopentano phenanthrene carbon structure remains intact.

10. The method according to claim 1, wherein the heating takes place at a temperature of 280°–400° C.

11. The method according to claim 1, wherein the heating takes place in the presence of an inert solvent whose boiling point is not substantially lower than the temperature at which the side chain is split off.

12. The method according to claim 1, wherein the heating takes place in the presence of a metal chloride cracking catalyst.

13. The method of producing oxygenated cyclopentano phenanthrene compounds which comprises subjecting a cyclopentano polyhydro phenanthrene compound, wherein the cyclopentano ring is unsubstituted and purely hydrocarbon in nature, to the action of an oxidizing agent capable of introducing ketonic oxygen into the molecule.

14. The method of producing androstanedione which comprises heating cholestene at a temperature at which the aliphatic side chain is split off from the cyclopentano-polyhydro-phenanthrene nucleus but at which such nucleus remains intact, subjecting the product to an oxidizing treatment whereby oxygen is joined to the hydrocarbon nucleus, treating the reaction product with an agent capable of effecting molecular rearrangement of the oxide so produced to the ketonic form, reacting the mixture with semicarbazide, separating the disemicarbazide of androstanedione so obtained and splitting such compound to liberate free androstanedione.

15. The method of producing 3-methoxy-trans-androsterone (17) which comprises heating dihydrocholesterol-methyl-ether at a temperature at which the side chain is split off but at which the cyclopentano phenanthrene nucleus remains intact, separating the cyclopentano-polyhydrophenanthrene compound so obtained and oxidizing the same to introduce oxygen into the molecule, and then separating the ketonic reaction product by means of a ketone reagent and then splitting the resulting compound to liberate the free ketone.

16. Saturated and unsaturated 3-keto cyclopentano-polyhydro-phenanthrene compounds of the general structural formula.

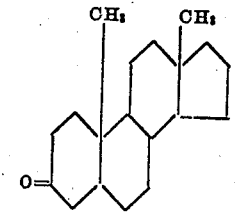

17. Saturated and unsaturated cyclopentanophenanthrene compounds of the general structural formula

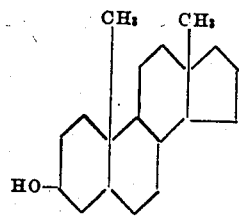

18. A cyclopentano-phenanthrene compound obtained by splitting off the aliphatic side chain from a compound of the group consisting of cholestene, tetrahydrostigmasterol, dihydrositosterol, dihydrocholesterol, tetrahydroergosterol, coprosterol, epi-dihydrocholesterol, and their derivatives, including cholestanone, cholestenone, the organic and inorganic esters, ethers, and acetals, the cyclopentano group of said compound being unsubstituted and purely hydrocarbon in nature.

19. Dimethyl cyclopentano polyhydro phenanthrene compounds free of aliphatic side chains in the cyclopentano ring and containing a substituting group in the first ring which on hydrolysis is replaceable by an OH group, the cyclopentano ring being purely hydrocarbon in nature.

20. A 10,13-dimethyl cyclopentano-polyhydrophenanthrene compound wherein the cyclopentano ring is purely hydrocarbon in nature and is free of aliphatic side chains, the first ring being unsaturated.

21. A 10,13-dimethyl cyclopentano-polyhydrophenanthrene compound in which the cyclopentano ring is purely hydrocarbon in nature and wherein the first ring contains a substituting group which on hydrolysis is replaceable by an OH group.

22. 3-methoxy cyclopenteno polyhydro phenanthrene.

23. The method of producing therapeutically valuable substances which comprises subjecting a member of the group consisting of cholestene, dihydrocholesterol, tetrahydrostigmasterol, dihydrositosterol, tetrahydroergosterol, coprosterol, epidihydrocholesterol, and their derivatives, including cholestanone, cholestenone, the organic and inorganic esters, ethers, and acetals, to a temperature at which the aliphatic side chain is split off but at which the cyclopentano-phenanthrene structure remains intact, oxidizing the cyclopentano-phenanthrene compound so obtained, treating the reaction product with an agent capable of effecting molecular rearrangement of the resulting oxide to the ketone form, and separating the ketonic product.

24. The method of producing therapeutically valuable substances which comprises subjecting a cholesterol compound to an elevated temperature at which the aliphatic side chain is split off but at which the cyclopentano-phenanthrene structure remains intact, oxidizing the product so obtained, treating the reaction product with an agent capable of effecting molecular rearrangement of the resulting oxide to the ketonic form, and separating the ketonic product.

25. The method according to claim 3, wherein the heating takes place at temperatures above 280° C.

26. The method according to claim 3, wherein the heating takes place in the presence of an inert solvent whose boiling point is not substantially lower than the temperature at which the side chain is split off.

27. A 10,13-dimethyl cyclopentano polyhydro phenanthrene compound wherein the cyclopentano ring is purely hydrocarbon in nature and is free of aliphatic side chains, an oxygen-containing group being located at the 3-carbon.

ERWIN SCHWENK.
BRADLEY WHITMAN.